United States Patent
So et al.

(10) Patent No.: US 8,605,236 B2
(45) Date of Patent: Dec. 10, 2013

(54) LIQUID CRYSTAL DISPLAY APPARATUS HAVING COLOR FILTER WITH COLOR CONNECTION ON BLACK MATRIX AND METHOD OF MANUFACTURING THE SAME

(75) Inventors: Dong-Yoon So, Yongin (KR); Sang-Woo Park, Yongin (KR)

(73) Assignee: Samsung Display Co., Ltd. (KR)

( * ) Notice: Subject to any disclaimer, the term of this patent is extended or adjusted under 35 U.S.C. 154(b) by 457 days.

(21) Appl. No.: 12/833,889

(22) Filed: Jul. 9, 2010

(65) Prior Publication Data

US 2011/0216264 A1 Sep. 8, 2011

(30) Foreign Application Priority Data

Mar. 2, 2010 (KR) .............................. 2010-0018566

(51) Int. Cl.
*G02F 1/1335* (2006.01)
*G09G 3/36* (2006.01)

(52) U.S. Cl.
USPC .............. 349/106; 349/107; 349/108; 345/88

(58) Field of Classification Search
USPC ..................... 349/106–108; 345/88
See application file for complete search history.

(56) References Cited

U.S. PATENT DOCUMENTS

| | | | |
|---|---|---|---|
| 6,215,538 B1 * | 4/2001 | Narutaki et al. | 349/106 |
| 7,193,668 B2 * | 3/2007 | Kim | 349/106 |
| 7,800,717 B2 * | 9/2010 | Kuribayashi et al. | 349/109 |
| 2004/0095528 A1 | 5/2004 | Nakamura et al. | |
| 2004/0223095 A1 * | 11/2004 | Tsubata et al. | 349/106 |
| 2005/0121098 A1 * | 6/2005 | Kim et al. | 141/1 |
| 2007/0046868 A1 * | 3/2007 | Ishigaki et al. | 349/108 |

FOREIGN PATENT DOCUMENTS

| | | |
|---|---|---|
| JP | 06109912 | 4/1994 |
| JP | 2009145762 | 7/2009 |
| KR | 10-2004-0079831 | 9/2004 |
| KR | 1020090019695 | 2/2009 |

OTHER PUBLICATIONS

Korean Office Action dated Jun. 29, 2011 in Korean Priority Application No. 10-2010-0018566.
Registration Determination Certificatee dated Sep. 19, 2012 in Korean Priority Patent Application No. 10-2010-0018566.

* cited by examiner

*Primary Examiner* — Hoan C Nguyen
(74) *Attorney, Agent, or Firm* — Knobbe Martens Olson & Bear LLP

(57) ABSTRACT

An LCD apparatus and method of manufacturing the same is disclosed. The LCD apparatus includes a backlight; a first electrode and a second electrode disposed over the backlight; a liquid crystal layer disposed between the first electrode and the second electrode; and a color filter unit including a first color filter, a second color filter, and a third color filter, disposed over the second electrode, where the first color filter includes a plurality of first regions and a plurality of first connection portions, each first connection portion connecting two adjacent first regions to each other, and the second color filter includes a plurality of second regions and a plurality of second connection portions, each second connection portion connecting two adjacent second regions to each other.

10 Claims, 7 Drawing Sheets

LIQUID CRYSTAL DISPLAY APPARATUS HAVING COLOR FILTER WITH COLOR CONNECTION ON BLACK MATRIX AND METHOD OF MANUFACTURING THE SAME

CROSS-REFERENCE TO RELATED APPLICATIONS

This application claims the benefit of Korean Patent Application No. 10-2010-0018566, filed on Mar. 2, 2010, in the Korean Intellectual Property Office, the disclosure of which is incorporated herein in its entirety by reference.

BACKGROUND

1. Field

One or more embodiments of the present invention relate to a liquid crystal display apparatus and a method of manufacturing the liquid crystal display apparatus for improving image quality easily.

2. Description of the Related Technology

Recently, some display apparatuses are being replaced by portable thin flat panel display apparatuses. Among the flat panel display apparatuses, liquid crystal display apparatuses are popular due to their low power consumption and low electromagnetic wave generation.

Liquid crystal display apparatuses are not self-emissive display apparatuses; a backlight and a color filter are necessary. The color filter is typically formed to correspond to each of sub-pixels of the liquid crystal display apparatus to realize visible images.

A color filter may be formed by being patterned during a photolithography process, but there may be limitations in improving image quality characteristics of the liquid crystal display apparatus due to defects generated during the patterning process.

SUMMARY OF CERTAIN INVENTIVE ASPECTS

One or more embodiments of the present invention include a liquid crystal display apparatus capable of improving image quality and a method of manufacturing the liquid crystal display apparatus.

According to one or more embodiments of the present invention, a liquid crystal display (LCD) apparatus includes a backlight; a first electrode and a second electrode disposed on the backlight; a liquid crystal layer disposed between the first electrode and the second electrode; and a color filter unit including a first color filter, a second color filter, and a third color filter and disposed on the second electrode, wherein the first color filter includes a plurality of first regions and a first connection portion connecting two adjacent first regions to each other, and the second color filter includes a plurality of second regions and a second connection portion connecting two adjacent second regions to each other.

The third color filter may be formed as a stripe.

The first connection portion may have a width that is smaller than a width of the first regions, and the second connection portion may have a width that is smaller than a width of the second regions.

A thickness of the first connection portion may be smaller than a thickness of the first regions, and a thickness of the second connection portion may be smaller than a thickness of the second regions.

The LCD apparatus may further include a black matrix formed on a peripheral portion of regions where images are displayed, and the first and second connection portions may correspond to the black matrix.

Each of the first regions of the first color filter may correspond to a first sub-pixel for displaying a first color and each of the second regions of the second color filter may correspond to a second sub-pixel for displaying a second color.

According to one or more embodiments of the present invention, a method of manufacturing an LCD apparatus includes preparing a backlight; forming a first electrode and a second electrode on the backlight; forming a liquid crystal layer between the first electrode and the second electrode; and forming a color filter unit including a first color filter, a second color filter, and a third color filter on the second electrode, wherein the first color filter includes a plurality of first regions and a first connection portion connecting two adjacent first regions to each other, and the second color filter includes a second regions and a plurality of second connection portion connecting two adjacent second regions to each other.

The forming of the color filter unit may include forming the third color filter after forming the first color filter and the second color filter.

The forming of the color filter unit may include forming the first regions and the first connection portion simultaneously by using a half-tone mask when the first color filter is formed.

The forming of the color filter unit may include forming the second regions and the second connection portion simultaneously by using a half-tone mask when the second color filter is formed.

The third color filter may be formed as a stripe.

The first connection portion may have a width that is smaller than a width of the first regions, and the second connection portion may have a width that is smaller than a width of the second regions.

A thickness of the first connection portion may be smaller than a thickness of the first regions, and a thickness of the second connection portion may be smaller than a thickness of the second regions.

The method may further include forming a black matrix on a peripheral portion of regions where images are displayed, and the first and second connection portions may correspond to the black matrix.

The forming of the color filter unit may be performed after forming the black matrix.

Each of the first regions of the first color filter may correspond to a first sub-pixel for displaying a first color and each of the second regions of the second color filter may correspond to a second sub-pixel for displaying a second color.

One aspect is a liquid crystal display (LCD) apparatus including: a backlight, a first electrode and a second electrode disposed over the backlight, a liquid crystal layer disposed between the first electrode and the second electrode, and a color filter unit including a first color filter, a second color filter, and a third color filter, disposed over the second electrode, where the first color filter includes a plurality of first regions and a plurality of first connection portions, each first connection portion connecting two adjacent first regions to each other, and the second color filter includes a plurality of second regions and a plurality of second connection portions, each second connection portion connecting two adjacent second regions to each other.

The third color filter may be formed to have a stripe shape.

Each of the plurality of first connection portions may have a width that is smaller than a width of each of the plurality of first regions, and each of the plurality of second connection portions may have a width that is smaller than a width of each of the plurality of second regions.

A thickness of each of the plurality of first connection portions may be smaller than a thickness of each of the plurality of first regions, and a thickness of each of the plurality of second connection portions may be smaller than a thickness of each of the plurality of second regions.

The LCD apparatus may further include black matrix regions formed on a peripheral portion of regions where images are displayed, where the plurality of first and second connection portions may correspond to the black matrix regions.

Each of the first regions of the first color filter may correspond to a first sub-pixel for displaying a first color and each of the second regions of the second color filter may correspond to a second sub-pixel for displaying a second color.

The first color filter, when viewed in a direction extending along the plurality of first regions and first connection portions, may include a first display region of a first thickness and width, a first connection non-display region of a second thickness and width, where the first connection non-display region overlaps with a black matrix region of a third thickness, where the second thickness is smaller than the first thickness, where the sum of the second and third thicknesses is smaller than the first thickness and where the second width is smaller than the first width.

The color filter unit, when viewed in a direction extending along first, second and third color filters in areas where images are not displayed, may include a black matrix region along the length of the direction, a first connection portion of a first thickness and width above the black matrix in a first area, a second connection portion of the first thickness and width above the first connection portion and the black matrix in a second area, and a third color filter above the black matrix in a third area, where the first, second and third areas are distanced apart.

Another aspect is a method of manufacturing an LCD apparatus, the method including: using a backlight, providing a first electrode and a second electrode over the backlight, providing a liquid crystal layer between the first electrode and the second electrode, and forming a color filter unit including a first color filter, a second color filter, and a third color filter, over the second electrode, where the first color filter includes a plurality of first regions and a plurality of first connection portions, each first connection portion connecting two adjacent first regions to each other, and the second color filter includes a plurality of second regions and a plurality of second connection portions, each second connection portion connecting two adjacent second regions to each other.

The forming of the color filter unit may include forming the third color filter after forming the first color filter and the second color filter.

The forming of the color filter unit may include forming the plurality of first regions and the plurality of first connection portions simultaneously by using a half-tone mask when the first color filter is formed.

The forming of the color filter unit may include forming the plurality of second regions and the plurality of second connection portions simultaneously by using a half-tone mask when the second color filter is formed.

The third color filter may be formed in the shape of a stripe.

Each of the plurality of first connection portions may have a width that is smaller than a width of each of the plurality of first regions, and each of the plurality of second connection portions may have a width that is smaller than a width of each of the plurality of second regions.

A thickness of each of the plurality of first connection portions may be smaller than a thickness of each of the plurality of first regions, and a thickness of each of the plurality of second connection portions may be smaller than a thickness of each of the plurality of second regions.

The method may further include forming black matrix regions on a peripheral portion of regions where images are displayed, where the plurality of first and second connection portions correspond to the black matrix regions.

The forming of the color filter unit may be performed after forming the black matrix regions.

Each of the plurality of first regions of the first color filter may correspond to a first sub-pixel for displaying a first color and each of the plurality of second regions of the second color filter may correspond to a second sub-pixel for displaying a second color.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF CERTAIN INVENTIVE EMBODIMENTS

Figure 1:
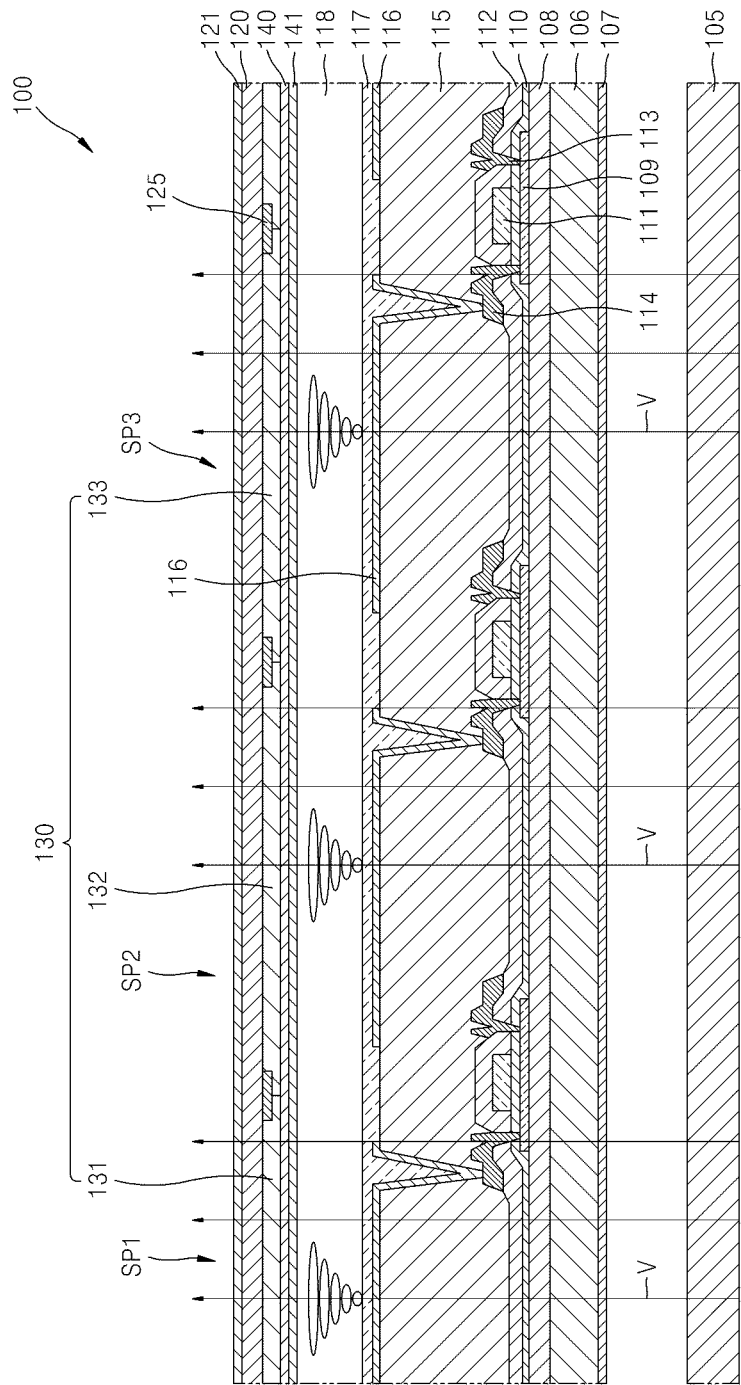
FIG. 1 is a cross-sectional view of an embodiment of a liquid crystal display (LCD) apparatus.

Reference will now be made in detail to embodiments, examples of which are illustrated in the accompanying drawings, wherein like reference numerals generally refer to the like elements throughout. In this regard, the embodiments may have different forms and should not be construed as being limited to the descriptions set forth herein. Embodiments are merely described below, by referring to the figures, to explain aspects of the present description.

Figure 2:
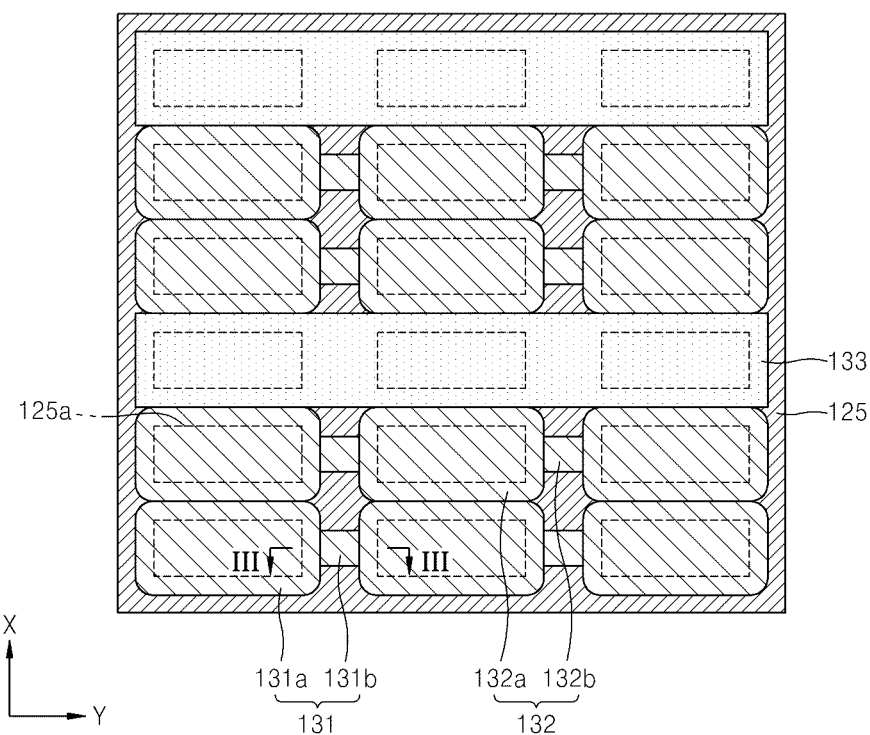
FIG. 2 is a plan view of an embodiment of a color filter unit included in the embodiment of the LCD shown in FIG. 1.
Figure 3:
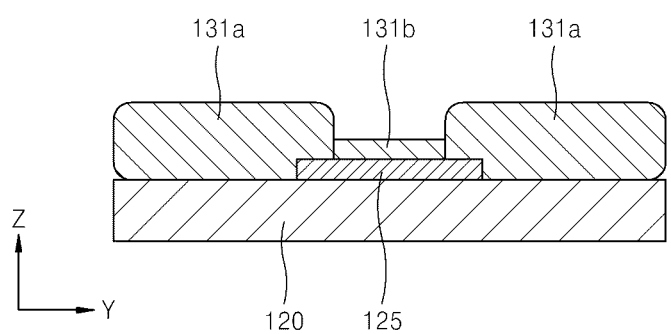
FIG. 3 is a cross-sectional view taken along line of FIG. 2.

FIG. 1 is a cross-sectional view of an embodiment of a liquid crystal display (LCD) apparatus 100, FIG. 2 is a plan view of an embodiment of a color filter unit included in the embodiment of the LCD shown in FIG. 1, and FIG. 3 is a cross-sectional view taken along line of FIG. 2.

Referring to FIGS. 1 to 3, an embodiment of the LCD apparatus 100 includes a backlight 105, a first electrode 116, a second electrode 140, a liquid crystal layer 118, and a color filter unit 130. The LCD apparatus 100 includes sub-pixels for visible rays, in particular, a first sub-pixel SP1, a second sub-pixel SP2, and a third sub-pixel SP3. The first sub-pixel SP1, the second sub-pixel SP2, and the third sub-pixel SP3 display different colors from each other.

The backlight 105 may include one of various kinds of light sources, and may emit light towards the liquid crystal layer 118. In FIG. 1, the light emitted from the backlight 105 is denoted by arrows V.

A first substrate 106 is disposed above the backlight 105. The first substrate 106 may be a transparent substrate, formed of a transparent glass material including SiO2, or a transparent plastic material.

A first polarization layer 107 is formed on a surface of the first substrate 106, facing the backlight 105. A buffer layer 108 is formed on the opposite surface of the first substrate 106. The buffer layer 108 provides an upper surface of the first substrate 106 with a smooth surface, and prevents impurities from contacting the first substrate 106. The buffer layer 108 may be formed of SiO2 and/or SiNx.

An active layer 109 is formed above the buffer layer 108 in a predetermined pattern. A gate insulating layer 110 is formed on the active layer 109, and a gate electrode 111 is formed on the gate insulating layer 110 in a predetermined pattern. An interlayer dielectric 112 is formed on the gate electrode 111 to cover the gate electrode 111. The gate insulating layer 110 and the interlayer dielectric 112 are etched by a dry etching process in order to expose the active layer 109. A source electrode 113 and a drain electrode 114 are formed so as to be electrically connected to the exposed region of the active layer 109.

A passivation layer 115 is formed to cover the source and drain electrodes 113 and 114. The passivation layer 115 is etched to expose the source electrode 113 or the drain electrode 114, and the first electrode 116 is formed in a predetermined pattern so as to electrically connect to the exposed electrode 113 or 114.

A second substrate 120 is disposed to face the first substrate 106. The second substrate 120 may be formed of a transparent material, like the first substrate 106. The liquid crystal layer 118 is disposed between the first substrate 106 and the second substrate 120. The color filter unit 130 is formed on a lower surface of the second substrate 120. The color filter unit 130 is described in detail below.

The second electrode 140 is formed below a lower surface of the color filter unit 130. A first alignment layer 117 and a second alignment layer 141 for orientation of the liquid crystal layer 118 are formed on surfaces of the first and second electrodes 116 and 140 that face each other.

A second polarization layer 121 is formed on an upper surface of the second substrate 120. In some embodiments, a protective layer (not shown) may be formed on the second polarization layer 121 in order to prevent the second polarization layer 121 from being damaged by an external force. In addition, a spacer (not shown) for defining the liquid crystal layer 118 may be formed between the color filter layer 130 and the passivation layer 115.

The color filter unit 130 includes a first color filter 131, a second color filter 132, and a third color filter 133. The color filters 130, 131 and 132 are respectively divided by black matrix 125.

The first color filter 131 may be of a first color, corresponding to the color of the first sub-pixel SP1, the second color filter 132 may be of a second color, corresponding to the color of the second sub-pixel SP2, and the third color filter 133 may be of a third color, corresponding to the color of the third sub-pixel SP3.

The embodiment shown in FIG. 1 includes a thin film transistor (TFT). In other embodiments, the LCD apparatus may not include a thin film transistor. In the LCD apparatus 100 of FIG. 1, a potential difference is generated between the first and second electrodes 116 and 140 by external signals controlled by the gate electrode 111, the source electrode 113, and the drain electrode 114. The alignment of the liquid crystal layer 118 is determined by the potential difference, and visible rays emitted from the backlight 105 are blocked or transmitted by the alignment of the liquid crystal layer 118. When the visible rays are transmitted through the color filter unit 130, color images are displayed.

Referring to FIGS. 2 and 3, in one embodiment, the first color filter 131 includes first regions 131a and first connection portions 131b. The first regions 131a are each formed to correspond to one first sub-pixel SP1, and the first connection portions 131b are formed to connect two adjacent first regions 131a to each other. In addition, the first connection portions 131b each have a width and a thickness that are less than each of those of the first regions 131a. The first connection portions 131b correspond to regions where images are not displayed. Fluidity of the liquid crystal layer 118 may be improved, and thus, image quality characteristics may be improved. In addition, the material used for forming the first color filter 131 may be reduced on the portions where images are not displayed, and thus, process efficiency may be improved. In addition, since the first regions 131a separated from each other are connected to each other by the first connection portions 131b, the first regions 131a may be stably located. Consequently, an image having uniform image quality may be realized easily.

The second color filter 132 has second regions 132a and second connection portions 132b. The second regions 132a are each formed to correspond to one second sub-pixel SP2, and the second connection portions 132b are formed to connect two adjacent second regions 132a to each other. In addition, the second connection portions 132b each have a width and a thickness that are less than those of each of the second regions 132a. The second connection portions 132b correspond to regions where images are not displayed. Fluidity of the liquid crystal layer 118 may be improved, and thus, image quality characteristics may be improved. In addition, the material used for forming the second color filter 132 may be reduced on the portions where images are not displayed, and thus, process efficiency may be improved. In addition, since the second regions 132a separated from each other are connected to each other by the second connection portions 132b, the second regions 132a may be stably located. Consequently, an image having uniform image quality may be realized easily.

The third color filter 133 is formed as a stripe.

The first color filter 131, the second color filter 132, and the third color filter 133 in the color filter unit 130 may be respectively patterned using a photolithography method. Using such a method, thin films for fabricating the color filters 131 through 133 may be fabricated using a spin-coating method. A thin film for fabricating the color filters may be formed entirely uniform via the spin coating method due to the connection portions of the first and second color filters 131 and 132, and thus, the uniformity of the color filter unit 130 may be improved.

The third color filter 133 is formed as a long stripe to prevent the first color filter 131 and the second color filter 132 from moving, and is formed to contact the spacer (not shown) that may define the liquid crystal layer 118 to easily maintain durability of the spacer and cell gaps.

The first color filter, when viewed in a direction extending along the first regions and first connection portions, comprises a first area with a first thickness and width, which corresponds to a display area. This area is adjacent to a non-display area, overlapping with the black matrix region of the LCD, which is thinner and narrower than the display area. The non-display area, consisting of the thickness of the black matrix and the connection region of the first color filter is thinner than the display area of the first color filter.

The second color filter, when viewed in a direction extending along the second regions and second connection portions, comprises a first area with a first thickness and width, which corresponds to a display area. This area is adjacent to a non-display area, overlapping with the black matrix region of the LCD, which is thinner and narrower than the display area. The non-display area, consisting of the thickness of the black matrix and the connection regions of the first and second color filters is thinner than the display area of the second color filter.

The third color filter comprises a display area and a non-display area of uniform thickness and width.

The color filter unit, when viewed in a direction extending along first, second and third color filters in areas where images are not displayed, comprises a black matrix region along the length of the direction, a first connection portion of a first thickness and width above the black matrix in a first area, a second connection portion of the first thickness and width above the first connection portion and the black matrix in a second area, and a third color filter above the black matrix in a third area, wherein the first, second and third areas are distanced apart.

FIGS. 4A through 4G are cross-sectional views illustrating an embodiment of a method of manufacturing an LCD apparatus.

Figure 4A:
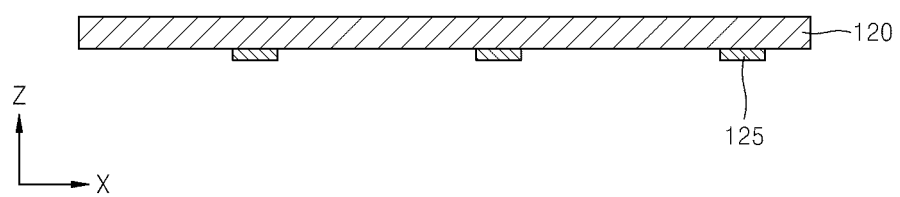
FIGS. 4A through 4G are cross-sectional views illustrating an embodiment of a method of manufacturing an LCD apparatus.

Referring to FIG. 4A, a black matrix 125 is formed on the second substrate 120. The areas of the second substrate 120 on which the black matrix 125 is not formed become the regions where images are displayed. The black matrix 125 is formed in a predetermined pattern, and absorbs visible rays entering from outside the LCD apparatus 100 and prevents color mixture and interference with visible rays emitted through the color filter unit 130 in order to improve contrast of the LCD apparatus 100.

Figure 4B:
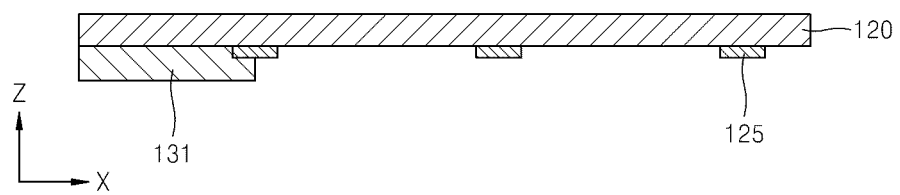
Figure 4C:
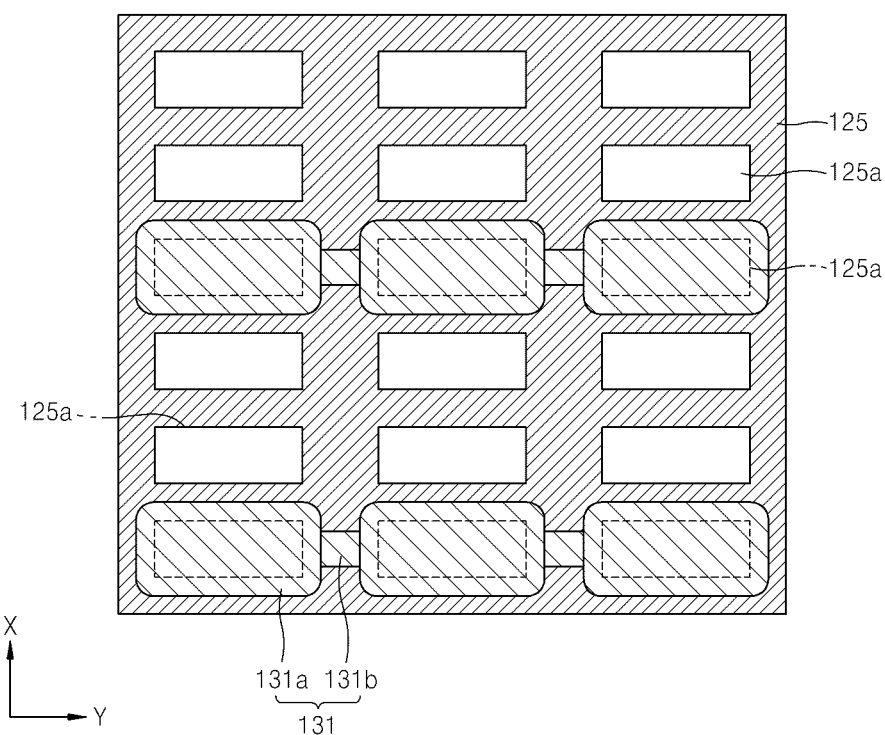

Referring to FIGS. 4B and 4C, the first color filter 131 is formed. FIG. 4C is a plan view of FIG. 4B.

The first regions 131a, which are regions where images are displayed, correspond to openings 125a of the black matrix 125. Thus, visible rays of the first color may be displayed through the first regions 131a.

Each of the first connection portions 131b is formed to have a width and thickness less than each of those of the first regions 131a. The first color filter 131 may be patterned using a photolithography process, and the first regions 131a and the first connection portions 131b may be formed using a half-tone mask via a single photolithography process. A half-tone mask generally includes a first transmissive portion for transmitting light, a second light shielding portion for preventing light from being transmitted, and a third semi-transmissive portion for transmitting only a portion of light.

Figure 4D:
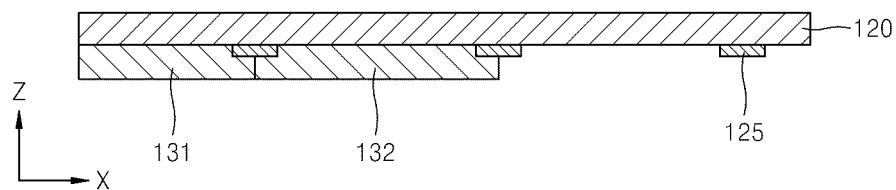
Figure 4E:
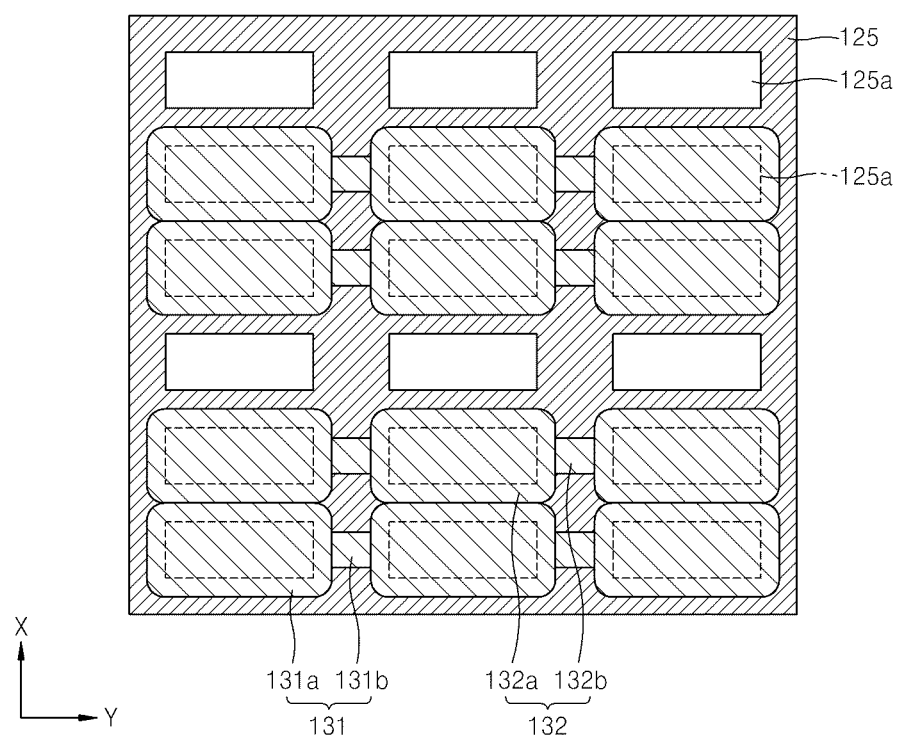

Referring to FIGS. 4D and 4E, the second color filter 132 is formed. FIG. 4E is a plan view of FIG. 4D.

The second regions 132a which are regions where images are displayed correspond to the openings 125a of the black matrix 125. Thus, visible rays of the second color may be displayed through the second regions 132a.

Each of the second connection portions 132b is formed to have a width and thickness less than each of those of the second regions 132a. The second color filter 132 may be patterned using a photolithography process, and the second regions 132a and the second connection portions 132b may be formed using a half-tone mask via a single photolithography process.

In order to form the second color filter 132, the material for forming the second color filter 132 is formed as a thin film, patterned using a photolithography process.

The material for forming the second color filter 132 may be formed as the thin film by using a spin coating process. The spreading characteristic of the material for forming the second color filter 132 with respect to the entire region varies depending on the shape of the formed first color filter 131. The uniformity of the thin film for forming the second color filter 132 varies depending on the shape of the first color filter 131.

In some embodiments, the first color filter 131 includes the first connection portions 131b that have a width and thickness less than those of the first regions 131a. The first connection portions 131b are paths through which the material for forming the second color filter 132 may be distributed, and the material for forming the second color filter 132 may be evenly distributed on the entire region when a spin coating process is performed. Therefore, the material for forming the second color filter 132 may be formed as the thin film having a uniform thickness. Thus, the second color filter 132 may be precisely patterned as desired with a uniform thickness on the entire region.

Since the material for forming the second color filter 132 is evenly distributed on the entire region through the first connection portions 131b, speckles are not generated and image quality of the LCD apparatus is improved.

In some embodiments, the second color filter 132 is formed after forming the first color filter 131. In other embodiments, first color filter 131 may be formed after forming the second color filter 132.

Figure 4F:
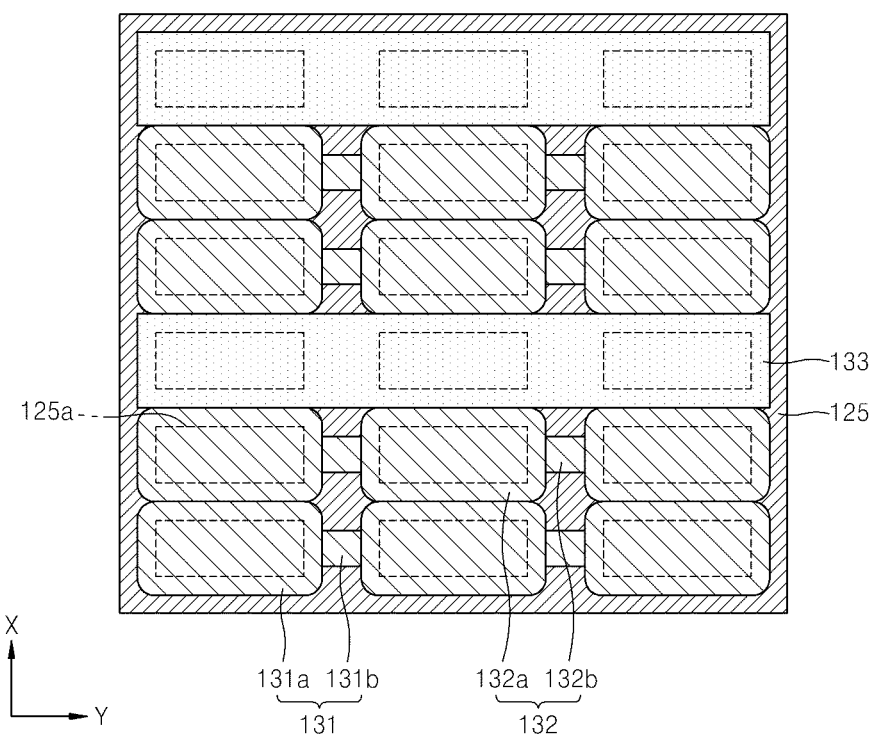

Referring to FIG. 4F, the third color filter 133 is formed.

The third color filter 133 is formed as a stripe so as to correspond to at least the openings 125a of the black matrix 125. Visible rays of the third color may be displayed through the third color filter 133.

The third color filter 133 is patterned as a stripe using a photolithography process. In order to form the third color filter 133, a thin film is formed by using a material for forming the third color filter 133. The thin film formed of the material for forming the third color filter 133 may be formed using a spin coating process. Since the first and second color filters 131 and 132 are formed already, the distribution and uniformity of the material for forming the third color filter 133 with respect to the entire region varies depending on the shapes of the first color filter 131 and the second color filter 132.

In some embodiments, the first color filter 131 includes the first connection portions 131b that have a width and thickness less than those of the first regions 131a, and the second color filter 132 includes the second connection portions 132b having a width and thickness less than those of the second regions 132a. The first connection portions 131b and the second connection portions 132b become paths through which the material for forming the third color filter 133 may be distributed, and the material for forming the third color filter 133 may be evenly distributed on the entire region when a spin coating process is performed. Therefore, the material for forming the third color filter 133 may be formed as a thin film having a uniform thickness. Thus, the third color filter 133 may be precisely patterned as desired with a uniform thickness on the entire region.

The material forming the third color filter 133 is evenly distributed on the entire region through the first connection portions 131b and the second connection portions 132b, and thus, speckles are not generated and image quality of the LCD apparatus is improved.

In addition, the third color filter 133 is formed as a stripe, which may support the first and second color filters 131 and 132. If the spacer (not shown) defining the liquid crystal layer 118 is formed to contact the third color filter 133 in post-processes, a height of the spacer is reduced and stability of the spacer may be improved.

Figure 4G:
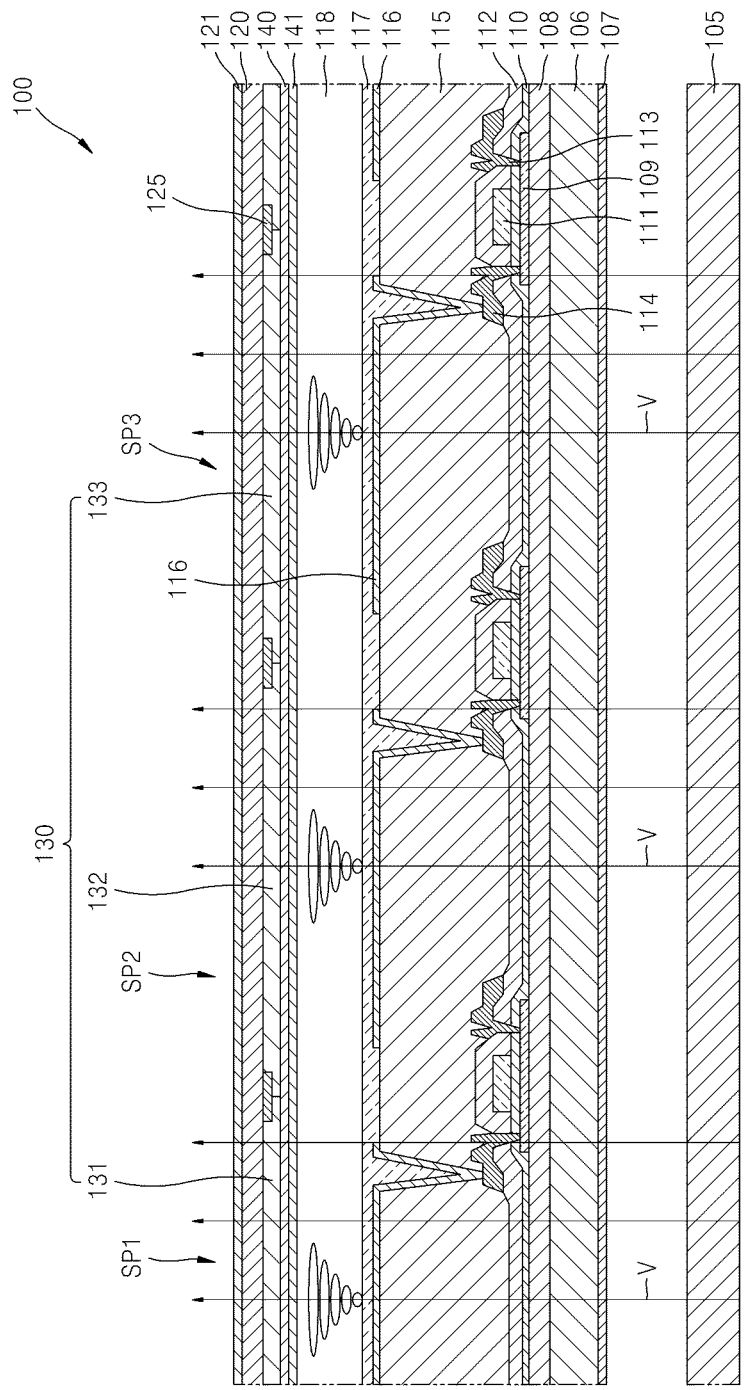

Referring to FIG. 4G, the LCD apparatus 100 is shown in its fabricated state. The backlight 105, the first electrode 116, the second electrode 140, and the liquid crystal layer 118 are formed.

Processes for forming the layers on the first substrate 106 and forming the liquid crystal layer 118 may be performed separately from the process of forming the color filter unit 130. Thus, these processes may be formed before or after forming the color filter unit 130.

According to one embodiment of the method of manufacturing the LCD apparatus 100, the first color filter 131 may include the first connection portions 131b having a width and thickness less than those of the first regions 131a and the second color filter 132 may include the second connection portions 132b having a width and thickness less than those of the second regions 132a, and thus, the second color filter 132 may be formed after forming the first color filter 131, and the material for forming the second color filter 132 is evenly distributed throughout the entire region on the substrate to form the second color filter 132 to a uniform thickness. When the third color filter 133 is formed, the material for forming the third color filter 133 is evenly distributed on the entire region so as to form the third color filter 133 to a uniform thickness.

Therefore, defects such as diagonal speckles may be reduced, and the LCD apparatus 100 fabricated may have improved image quality.

Since the liquid crystal layer 118 is easily moved, the improvement in the image quality characteristics is increased and stability of the color filter unit 130 is improved.

The third color filter 133 of the stripe shape supports the first color filter 131 and the second color filter 132 to improve the durability of the color filter unit 130 and maintain the cell gap.

It will be understood that the exemplary embodiments described herein should be considered in a descriptive sense only and not for purposes of limitation. Descriptions of features or aspects within each embodiment should be considered as available for other similar features or aspects in other embodiments.

What is claimed is:

1. A liquid crystal display (LCD) apparatus comprising:
    a backlight;
    a first electrode and a second electrode disposed over the backlight, wherein the first and second electrodes extend in a plane along a first direction;
    a liquid crystal layer disposed between the first electrode and the second electrode; and
    a color filter unit comprising a first color filter, a second color filter, and a third color filter, disposed over the second electrode, wherein the first, second and third color filters are respectively divided by a black matrix having a black matrix thickness when viewed in a second direction perpendicular to the first direction;
    wherein the first color filter and the second color filter each comprises:
        a plurality of display regions, each display region having a first length in a third direction perpendicular to the first direction and to the second direction, a first thickness in the second direction, and a first width in the first direction, and
        a plurality of connection portions, each connection portion having a second length in the third direction, a second thickness in the second direction, and a second width in the first direction, each connection portion overlapping with the black matrix and connecting two adjacent display regions to each other,
    wherein the first length is larger than the second length, and wherein the first width is larger than the second width, and
    wherein the sum of the black matrix thickness and the second thickness is smaller than the first thickness.

2. The LCD apparatus of claim 1, wherein the third color filter is formed to have a stripe shape.

3. The LCD apparatus of claim 1, wherein the black matrix regions are formed on a peripheral portion of display regions.

4. The LCD apparatus of claim 1, wherein each of the respective display regions of the first and second color filters corresponds to a sub-pixel for displaying a respective color.

5. A method of manufacturing an LCD apparatus, the method comprising:
    using a backlight;
    providing a first electrode and a second electrode over the backlight, wherein the first and second electrodes extend in a plane along a first direction;
    providing a liquid crystal layer between the first electrode and the second electrode; and
    forming a color filter unit comprising a first color filter, a second color filter, and a third color filter, over the second electrode, wherein the first, second and third color filters are respectively divided by a black matrix having a black matrix thickness when viewed in a second direction perpendicular to the first direction;
    wherein the first color filter and the second color filter each comprises:
        a plurality of display regions, each display region having a first length in a third direction perpendicular to the first direction and to the second direction, a first thickness in the second direction, and a first width in the first direction, and
        a plurality of connection portions, each connection portion having a second length in the third direction, a second thickness in the second direction, and a second width in the first direction, each connection portion overlapping with the black matrix and connection two adjacent display regions to each other,
    wherein the first length is larger than the second length, and wherein the first width is larger than the second width, and
    wherein the sum of the black matrix thickness and the second thickness is smaller than the first thickness.

6. The method of claim 5, wherein the forming of the color filter unit comprises forming the third color filter after forming the first color filter and the second color filter.

7. The method of claim 5, wherein the forming of the color filter unit comprises forming the plurality of display regions and the plurality of connection portions simultaneously by using a half-tone mask when the first and second color filters are respectively formed.

8. The method of claim 5, wherein the third color filter is formed in the shape of a stripe.

9. The method of claim 5, wherein the black matrix regions are formed on a peripheral portion of display regions.

10. The method of claim 5, wherein each of the plurality of respective display regions of the first and second color filters corresponds to a sub-pixel for displaying a respective color.

* * * * *

UNITED STATES PATENT AND TRADEMARK OFFICE
CERTIFICATE OF CORRECTION

PATENT NO.        : 8,605,236 B2  
APPLICATION NO.   : 12/833889  
DATED             : December 10, 2013  
INVENTOR(S)       : Dong-Yoon So et al.

Page 1 of 1

It is certified that error appears in the above-identified patent and that said Letters Patent is hereby corrected as shown below:

On the Title Page

At page 1 (item 56), column 2, line 14, please delete "Certificatee", and insert -- Certificate --, therefor.

In the Claims

At column 10, line 37, claim 5 please delete "connection", and insert -- connecting --, therefor.

Signed and Sealed this
Eighth Day of July, 2014

Michelle K. Lee
*Deputy Director of the United States Patent and Trademark Office*